Mar. 20, 1923.  S. H. SUMMERSCALES  1,448,981
AUTOMOBILE TOP
Filed Jan. 11, 1921.  3 sheets-sheet 1

WITNESSES

INVENTOR
S.H. SUMMERSCALES
BY
ATTORNEYS

Mar. 20, 1923.
S. H. SUMMERSCALES
AUTOMOBILE TOP
Filed Jan. 11, 1921
1,448,981
3 sheets-sheet 2
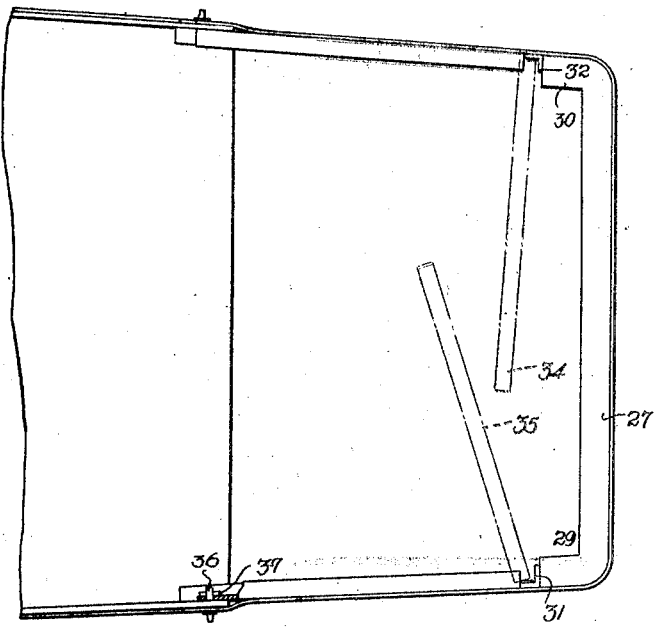
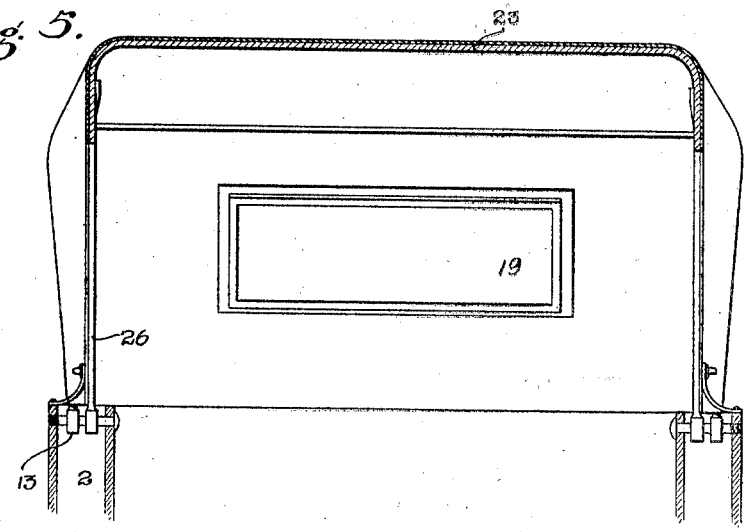
WITNESSES
INVENTOR
S.H. SUMMERSCALES
BY
ATTORNEYS Mar. 20, 1923.

S. H. SUMMERSCALES

AUTOMOBILE TOP

Filed Jan. 11, 1921

WITNESSES

INVENTOR
S. H. SUMMERSCALES
BY
ATTORNEYS

Patented Mar. 20, 1923.

1,448,981

UNITED STATES PATENT OFFICE.

SAMUEL HENRY SUMMERSCALES, OF WINNIPEG, MANITOBA, CANADA.

AUTOMOBILE TOP.

Application filed January 11, 1921. Serial No. 436,547.

*To all whom it may concern:*

Be it known that I, SAMUEL H. SUMMERSCALES, a citizen of Canada, and a resident of Winnipeg, in the Province of Manitoba and Dominion of Canada, have invented a new and Improved Automobile Top, of which the following is a full, clear, and exact description.

This invention relates to an automobile body structure and tops and has for an object to provide an improved construction which may be easily manipulated so as to be confined within the walls of the body or extending above the top of the body.

Another object of the invention is to provide a folding top for automobiles which may be collapsed in such a manner as to be nested without the necessity of taking the same apart.

A further object of the invention is to provide a top on the body for automobiles wherein the body is provided with openings at the back and sides for receiving a top capable of being nested in said openings.

In the accompanying drawings—

Figure 4 is a fragmentary bottom plan view of the front part of the top, the same being viewed from line 4—4 of Figure 2.

Figure 5 is a fragmentary sectional view through Figure 2 on line 5—5.

Figure 8:
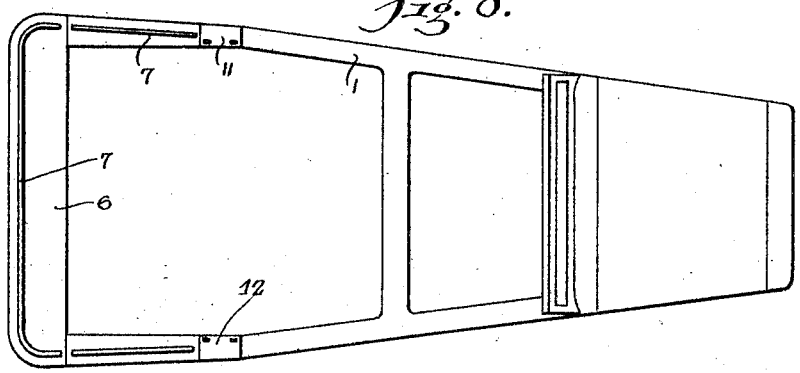
Figure 8 is a view similar to Figure 7 but showing the covering flaps in their lowered or operative position.

Referring to the accompanying drawings by numeral, 1 indicates an automobile body which may be of any desired construction except the rear part which is provided with a rear chamber or compartment 2 merging at the sides into compartments 3 and 4 extending from the rear compartment toward the front to a point adjacent the respective pivotal pins 5. The rear compartment 2 is normally covered by a flap 6 which may be of metal, wood or other material and if desired, provided with a covering of leather or other ornamentation. Preferably a flange 7 is provided on the flap 6 and said flap is hinged in a suitable manner to the rear wall of the compartment 2 so as to swing from the position shown in Figure 2 to that shown in Figure 3. Side flaps 9 and 10 are also provided which are constructed similar to flap 6 but taper as indicated in Figure 8. Adjacent the front end of the side flaps 9 and 10 are auxiliary flaps 11 and 12 formed of leather or other suitable flexible material designed to cover the pivot ends 13 of the frame 14. It will be noted that the frame 14 has the pivot end offset (Figure 2) so that said end will be located almost entirely within the respective compartments 3 and 4 while the lower edge 15 of the frame 14 will be resting on the respective flaps 9 and 10 and parallel therewith. The frame 14 is substantially wedge-shaped and if desired is provided with a window 16 on each side held in place by suitable fastening members 17. This frame may be of wood, metal or other stiff material and is provided with a body section 18 of wood or other stiff material in which is placed a rear window 19 held in place by suitable clamping members 20.

Figure 3:
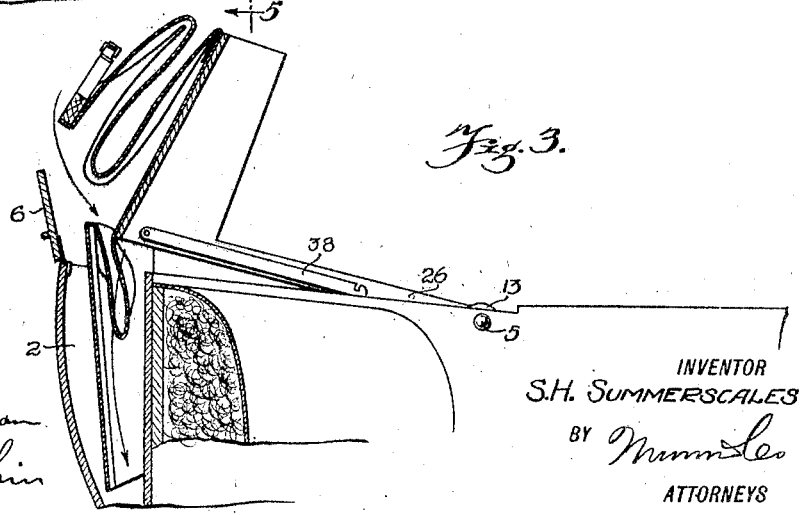
Figure 3 is a fragmentary view similar to Figure 2 but showing the top about to be nested in the body.
Figure 6:
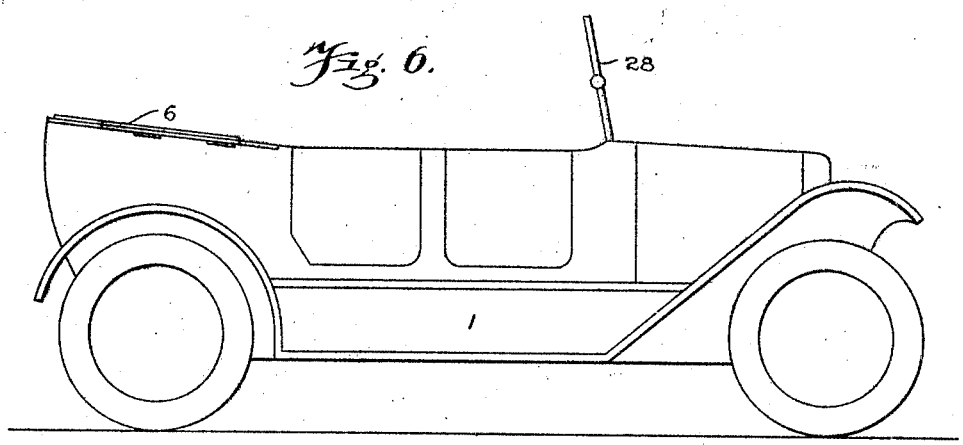
Figure 6 is a view similar to Figure 1 but showing the automobile as it appears when the top is nested in the body.
Figure 7:
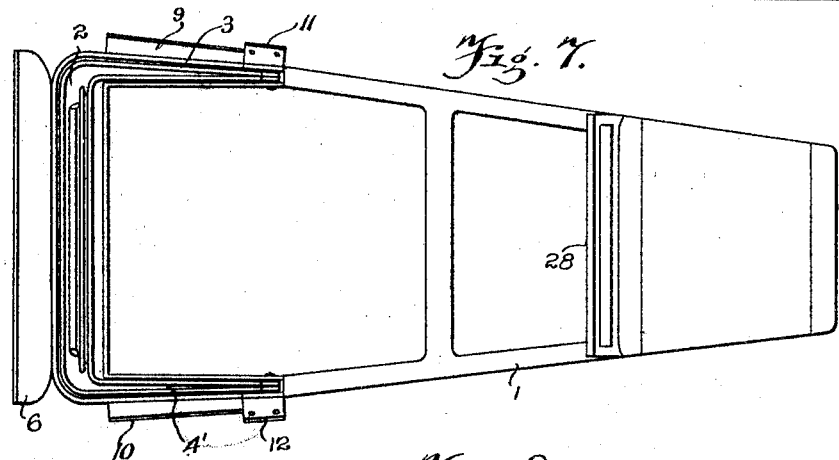
Figure 7 is a top plan view of the rear part of the car body with the covering flaps in open position illustrating how the top is nested.

As the frame 14 is rigid throughout including the section 18 the same swings bodily downwardly into compartments 2, 3 and 4 when the top is to be nested in said compartments. The next section to the section 18, namely, section 21 is of flexible material and may be, if desired, merely covered with canvas or other material 22 which also covers the section 23 and extends forwardly for forming the forward section 24. Section 23 is made of wood, metal or some other stiff material and merges into two side arms 26 which are journaled on the respective pins 5 so that this section may freely swing into the compartments 2, 3 and 4. The section 23 is slightly shorter than the frame 14 so that it may be easily nested therein and in fact the sections 21 and 24 should be nested between the sections 18 and 23 as indicated in Figure 3. In order to connect the front section 24 so that it will remain taut a plate 27 is provided which may be an ordinary wood board which is formed with openings for fititng the windshield 28 and is formed with rearwardly extending sections 29 and 30 (Figure 4). Angle brackets 31 and 32 are secured to these extensions and bracing bars 33 and 34 are hinged to these brackets so as to swing horizontally and thereby fold against the plate 27 when the parts are being folded as shown in Figure 3. A pair of auxiliary braces 35 are provided pivotally mounted on their respective braces 33 and 34 so as to move in a vertical plane. The respective braces 33, 34 and 35 are connected to the section 23 by suitable journal pins 36 (Figure 4) through which retaining pins 37 project for locking the various bracing bars in place.

Figure 1:
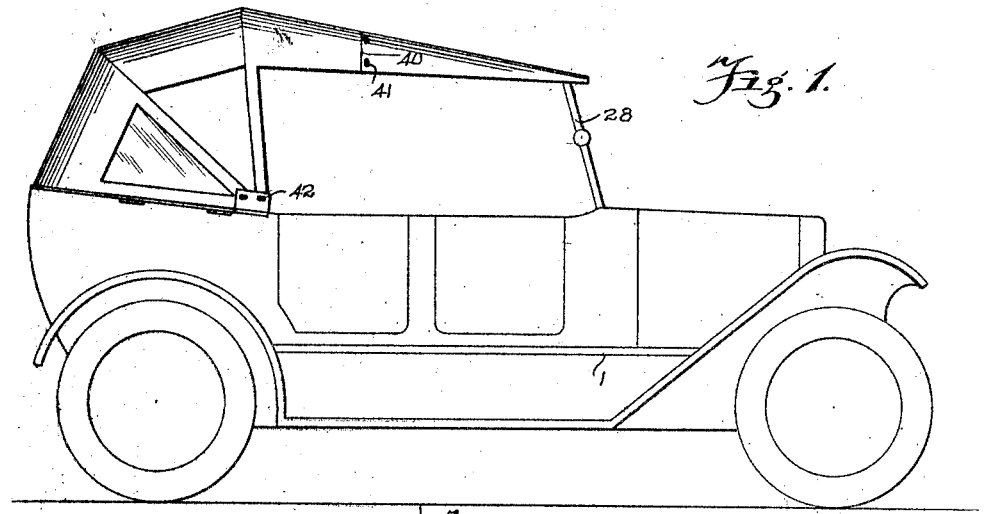
Figure 1 is a side view of an automobile having a body and top disclosing the embodiment of the invention.
Figure 2:
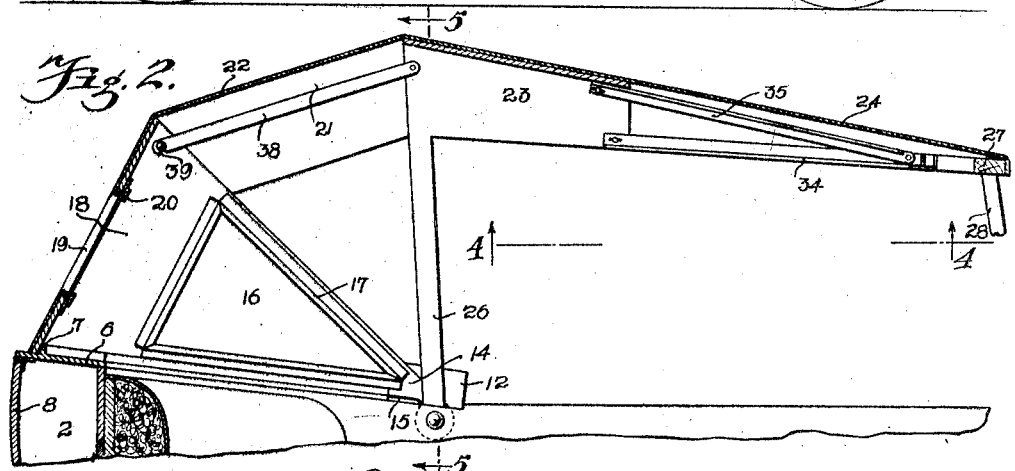
Figure 2 is a fragmentary longitudinal vertical section through part of the body and the top shown in Figure 1, said section being on an enlarged scale.

From Figure 2 it will be seen that suitable bracing bars 38 are provided and pivotally connected with section 23 and hooked over suitable pins 39 on section 18 whereby all of the sections are maintained rigid in respect to each other and the covering canvas or other material 22 is maintained taut. In order to provide a proper folding action for section 24 the side portions thereof are folded over the central portion and in order to do this a slit 40 is provided on each side of the top and suitable fastening means 41 used for normally locking these side portions as shown in Figure 1 when the top is in use. Suitable fastenings 42 similar to fastenings 41 are provided on the arms 26 and the frame 14 so as to button the flaps 11 and 12 as indicated in Figures 1 and 5.

When the parts are in the position shown in Figures 1 and 2 and it is desired to fold the same, the arms 33, 34 and 35 are loosened by moving these bars from the journal pins 36 and then these bars are folded against the plate 27 as indicated by dotted lines in Figure 4. The buttons or fastening means 41 are then operated for loosening the side portions of section 34 and said side portions are folded back over the top of the section The bracing links 38 are then disengaged and the rear section 18 raised until the covering flaps 6, 9 and 10 are moved to their open position as indicated in Figure 3. Plate 27 is then disconnected from the windshield and the parts folded back as shown in Figure 3. This movement is continued until the parts are completely within the compartments 2, 3 and 4. The covering flaps 6, 9, 10, 11 and 12 are then moved over to their closed or operative position as shown in Figure 8 whereupon the folding and storing operation of the top is completed. When this has been done the top is completely out of view and the only thing which may be seen is the respective flaps as indicated in Figure 8.

In case it should be desired to again raise the top the flaps are first raised and then the top moved forward and set up which acts in merely the reverse of the collapsing action.

What I claim is:—

An automobile top comprising a plurality of pivotally connected stiff sections and a plurality of flexible sections, one of said flexible sections being arranged at the front and provided with a flexible top portion, a front plate adapted to engage the windshield of an automobile, a pair of horizontal braces capable of swinging to a position against one edge of said plate, a pair of pivotally mounted auxiliary braces pivotally mounted on the first mentioned braces and movable therewith, said braces acting when the top is in use as means for maintaining the front flexible section taut.

SAMUEL HENRY SUMMERSCALES.